United States Patent
Le Ouay (10) Patent No.: US 7,853,588 B2
(45) Date of Patent: Dec. 14, 2010

(54) DATA PROCESSING APPARATUS FOR PROPAGATIVE CORRELATION

(75) Inventor: Franck Le Ouay, Paris (FR)

(73) Assignee: Criteo, Paris (FR)

( * ) Notice: Subject to any disclaimer, the term of this patent is extended or adjusted under 35 U.S.C. 154(b) by 349 days.

(21) Appl. No.: 11/858,069

(22) Filed: Sep. 19, 2007

(65) Prior Publication Data

US 2008/0086487 A1 Apr. 10, 2008

(30) Foreign Application Priority Data

Oct. 10, 2006 (FR) .................................. 06 08861

(51) Int. Cl.
*G06F 17/081* (2006.01)
(52) U.S. Cl. .................. 707/726; 707/723; 707/722; 707/705
(58) Field of Classification Search .................. 707/749
See application file for complete search history.

(56) References Cited

U.S. PATENT DOCUMENTS

| | | | | |
|---|---|---|---|---|
| 6,470,352 | B2 * | 10/2002 | Yaginuma | 707/102 |
| 7,194,483 | B1 * | 3/2007 | Mohan et al. | 707/104.1 |
| 2001/0049678 | A1 * | 12/2001 | Yaginuma | 707/3 |
| 2004/0158497 | A1 | 8/2004 | Brand | |
| 2006/0036640 | A1 | 2/2006 | Tateno et al. | |

OTHER PUBLICATIONS

Corresponding French Search Report dated Jun. 8, 2007.
Yang et al., "An improved Collaborative Filtering Method for Recommendations' Generation" 2004 IEEE International Conference on Systems, Man and Cybernetics, vol. 5, Oct. 10, 2004, pp. 4135-4139, XP010772976.
Sarwar et al., "Item-Based Collaborative Filtering Recommendation Algorithms" Proceedings of the International Conference on the World Wide Web, May 1, 2001, pp. 285-295, XP002228384.

* cited by examiner

*Primary Examiner*—Khanh B Pham
*Assistant Examiner*—Sheryl Holland
(74) *Attorney, Agent, or Firm*—Christie, Parker & Hale, LLP (57) ABSTRACT

A data processing apparatus for propagative correlation can include a memory to store a raw matrix with object identifiers and actor identifiers, in the presence or absence of a quantified matrix element, and a background module to convert the raw matrix into reclassified matrix blocks as a function of a criterion linked to the quantified matrix element. The data processing matrix can also include a selection manager to search for an input actor identifier in a first table, the links of which associate an actor identifier and one or more matrix blocks, and to present information depending on the contents of the associated matrix block or blocks. The background module can also include a cross-classifier to convert the raw matrix of the matrix element and a value matrix of the matrix element. The selection manager operates on the basis of the reclassified matrix blocks.

10 Claims, 5 Drawing Sheets

DATA PROCESSING APPARATUS FOR PROPAGATIVE CORRELATION

CROSS-REFERENCE TO RELATED APPLICATION

This application claims priority of French Patent Application Number 0608861, filed on Oct. 10, 2006.

The invention relates to the bringing together of data which are a priori heterogeneous, for the purpose of drawing from them a concrete proposal, which will be referred to herein as a "propagative correlation".

In general, the data in question associate objects from the real world and their perception or evaluation, particularly by people. As the overall field to be processed grows, the computing load increases very rapidly, as it is linked to the product of the number of objects by the number of users. The reason for this will be explained later on.

The current methods therefore use highly approximate models, and this obviously has a detrimental effect on the quality of the results obtained.

The invention sets out to improve the situation.

To this end, the invention proposes a data processing apparatus for propagative correlation which comprises:
  a memory for storing a raw matrix that crosses object identifiers and actor identifiers, in the presence or absence of a quantified matrix element,
  a background module capable of converting the raw matrix into rearranged matrix blocks as a function of a criterion linked to the quantified matrix element, and
  a selection manager capable, on receiving an input actor identifier, of looking up this input actor identifier in a first table which contains links, each of which associates an actor identifier and one or more matrix blocks associated with this actor identifier, and of presenting information depending on the contents of the matrix block or blocks associated with the input actor identifier.

In this apparatus, the background model comprises a cross-classifier for converting the raw matrix into reclassified matrix blocks in accordance with a criterion that combines a presence metric of the matrix element and a value metric of the matrix element, the selection manager operating on the basis of the rearranged matrix blocks.

An apparatus of this kind enables extremely satisfactory results to be obtained, as this approach makes it possible to take account of both the actor profiles and the object profiles. The classification thus carried out enables a configuration to be obtained which is particularly well suited to the problems of "voids" which are characteristic of this type of evaluation.

Optionally, and in particular embodiments, the apparatus described hereinbefore may have the following features:
  the background module may comprise a controller for calling up the cross-classifier with a criterion linked to the presence of the matrix element, in order to collate both the actor identifiers by the matrix element presence/absence profile according to the object identifiers, and the object identifiers by the matrix element presence/absence profile according to the actor identifiers, in order to convert the raw matrix into intermediate matrix blocks;
  the controller may iteratively and selectively call up the cross-classifier with a criterion linked to the value of the matrix element over at least some of the intermediate matrix blocks which have matrix element presence/absence profiles of a selected density to convert them into reclassified matrix blocks;
  the background module may further comprise a smoother capable of filling the emptied matrix elements of a given matrix block, as a function of a criterion linked to the density of the presence/absence profile of matrix elements of this block, to obtain a filled dense block;
  the smoother can selectively fill, by propinquity, the empty matrix elements of a matrix block which has a density of a chosen level;
  the smoother can fill the empty matrix elements of a matrix block on the basis of an iteration that selectively crosses the values of adjacent matrix elements;
  the smoother can fill, by averaging, the empty matrix elements of a matrix block which has a density of a chosen level; and
  the selection manager can present the information as a function of a second table, which contains links, each of which associates a matrix block and one or more object identifiers.

Further features and advantages will be more readily apparent from a perusal of the following description, provided in an illustrative and non-restrictive capacity, of embodiments illustrated in the drawings, wherein.

The drawings and description that follow essentially contain elements of a specific nature. They may therefore serve not only to help with the understanding of the present invention but also contribute to its definition, as necessary.

Moreover, the detailed description is supplemented by Annexe 1 which shows a particular method of collaborative filling, as will be explained hereinafter.

This annexe is set apart with the aim of clarification and to make it easier to refer to. It forms an integral part of the description and may therefore also contribute to the definition of the invention, if necessary.

Known data processing solutions make it possible to predict the evaluation that a person will make of an object which they do not know a priori, on the basis of evaluations of other objects by other people. These solutions conventionally consist in grouping objects or person that have similar characteristics into classes. These groups or classes are then used to determine, jointly in such a class, an evaluation parameter which will be propagated to other objects not yet processed. This involves a sort of prediction which may be reductively referred to as a "recommendation".

A number of difficulties arise in this field. In fact the data available are generally fairly disparate and few and far between. As a result, the propagative correlation, or, if preferred, the "recommendation", is at best of middling reliability.

Specifically, the complete set of possible objects has to be broken up into subsets containing a limited number of objects. The larger the subsets, the more hope there is of finding (at least) two people who have expressed preferences ("evaluation") regarding "common" objects and are therefore capable of forming the basis for a recommendation. Conversely, to obtain a process that results in reliable recommendations, the number of objects in each subset should not be too large. In fact, this presentation is simplified, as it is necessary to have both a large number of common objects and a large number of people, and this is even more unusual.

It will be perceived that it is not reasonably possible to work on the complete set of available data all at once, as this would involve a prohibitive computing workload, linked to the product of the number of objects by the number of people.

For this reason, simplified, or even random, methods are currently used. This is what various Internet sites and other data processing applications do in order to present a proposal to the user. Within the scope of a trading site, for example, this recommendation is useful for suggesting to a user a product that is thought to suit his tastes, and thus possibly achieve an additional sale.

Figure 1:
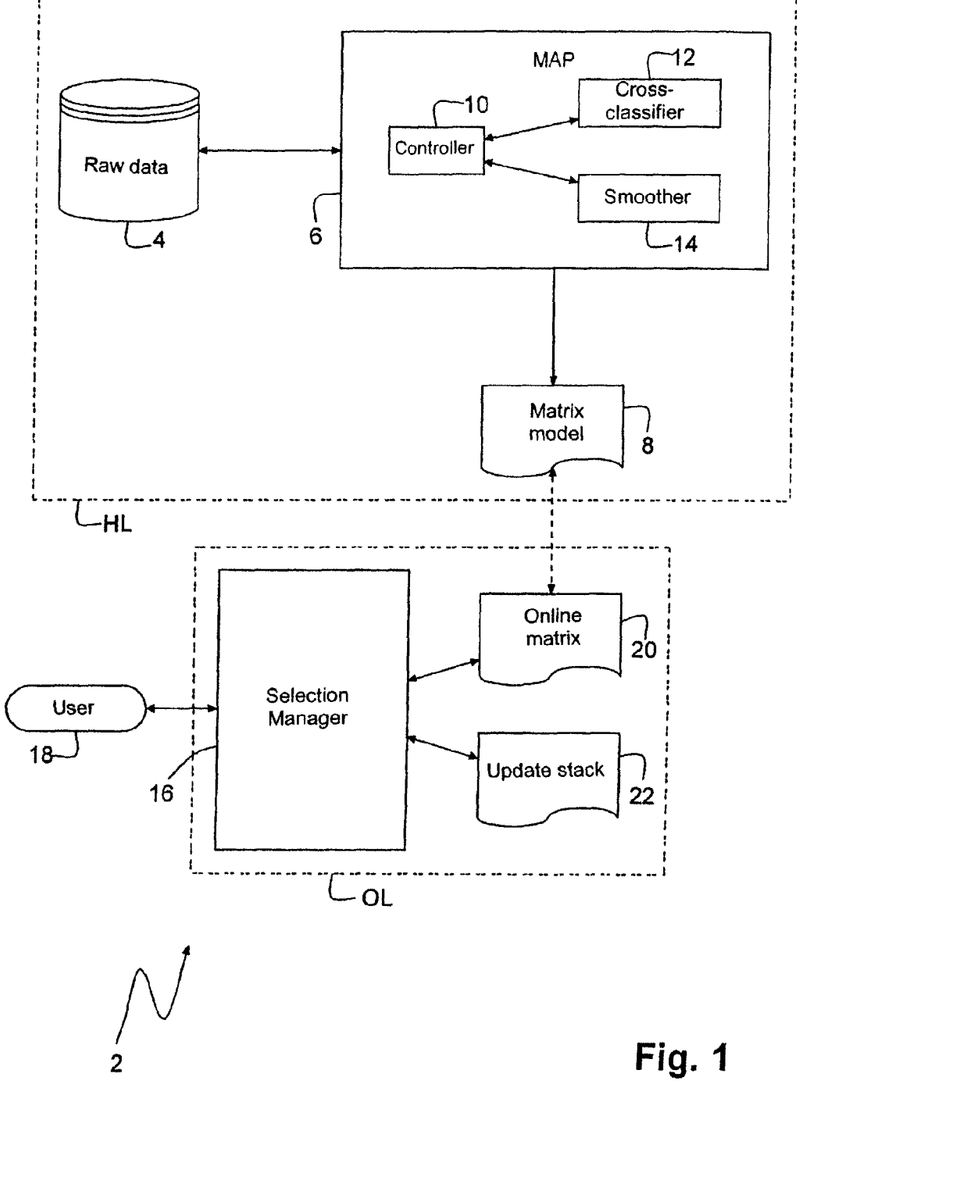
FIG. 1 shows a schematic view of the components of the invention.

FIG. 1 schematically shows the components of a data processing apparatus 2 according to the invention. The apparatus 2 comprises an off-line part HL and an on-line part OL.

The off-line part HL comprises a source of raw data 4 and a background module 6 which accesses the source 4 to produce a matrix model 8.

The data source 4 may be constructed in various ways, e.g. by means of a database such as the MovieLens database, or another database such as an LDAP directory.

The background module 6 comprises a controller 10 which interacts with a cross-classifier 12 and a smoother 14, as will be explained in the description of FIGS. 2 and 3. The classifier 12 and the smoother 14 are presented here as configurable modules, but they could equally be made in the form of a plurality of specialised modules.

The on-line part OL comprises a selection manager 16 which interacts with a user 18 on the one hand and with a set of on-line matrices 20 and an updating stack 22 on the other hand, to carry out evaluations which are here termed recommendations, as will be explained more fully in the description of FIG. 4.

The user 18 may be connected directly to a computer or a terminal that uses the apparatus 2, or he may be connected to the latter through an Internet server using a selection manager 16, by means of a web service, for example. Numerous other implementations are possible for the selection manager 16.

The set 20 is a copy of the matrix model 8 or at least can be directly deduced therefrom. The stack 22 may be in the form of a table, a conventional stack or any other suitable form.

When the background module 6 has finished calculating the model 8, the data from the stack 22 are integrated into the data source 4 and the matrix 20 is updated with the model 8 that has just been calculated. Then, the background module 6 reiterates the calculation of the model 8 to take account of the new data.

The matrix model 8 will now be explained further by reference to FIGS. 2 and 3.

Figure 2:
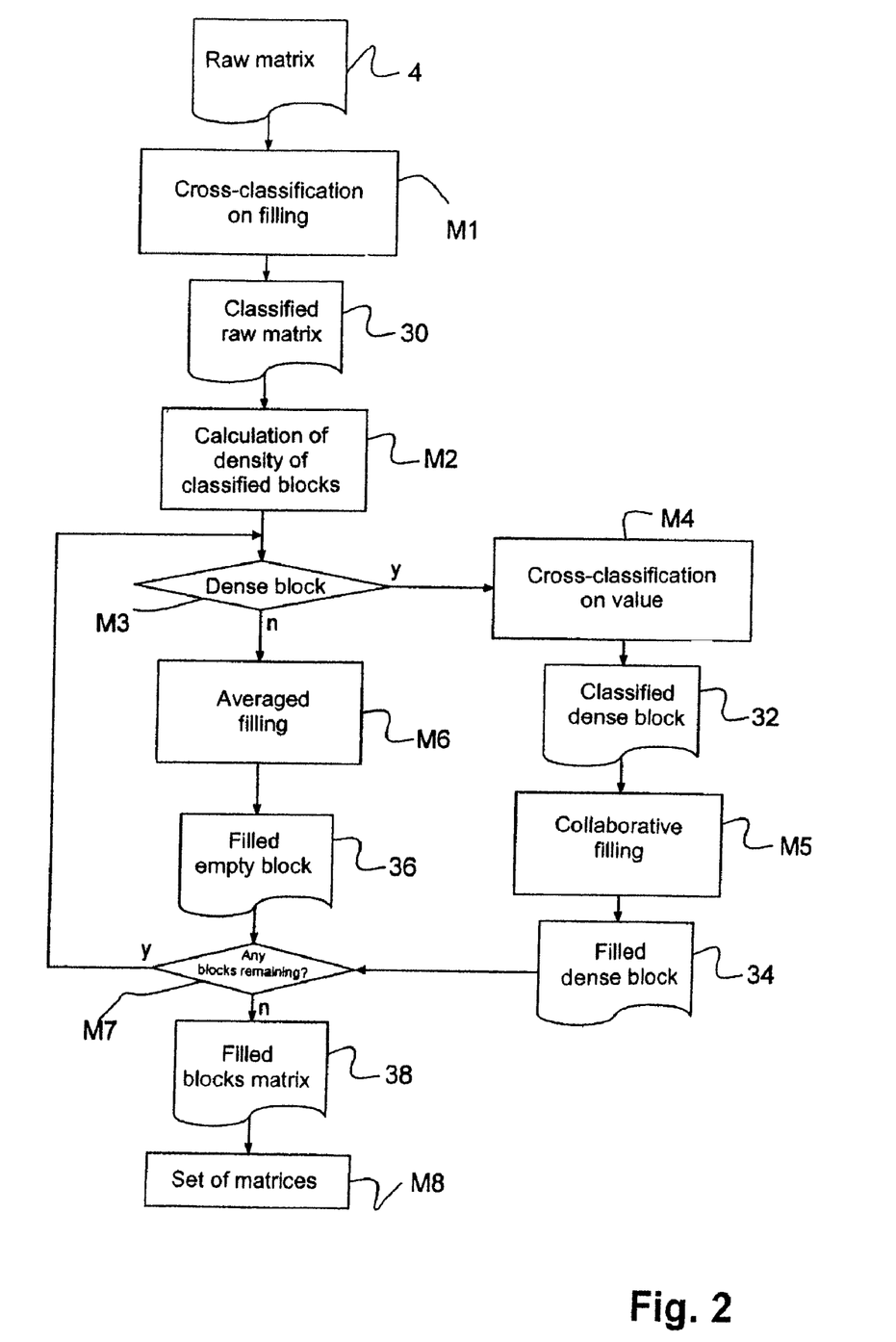
FIGS. 2 and 3 show a function carried out by an off-line part in FIG. 1 and its results.
Figure 3:
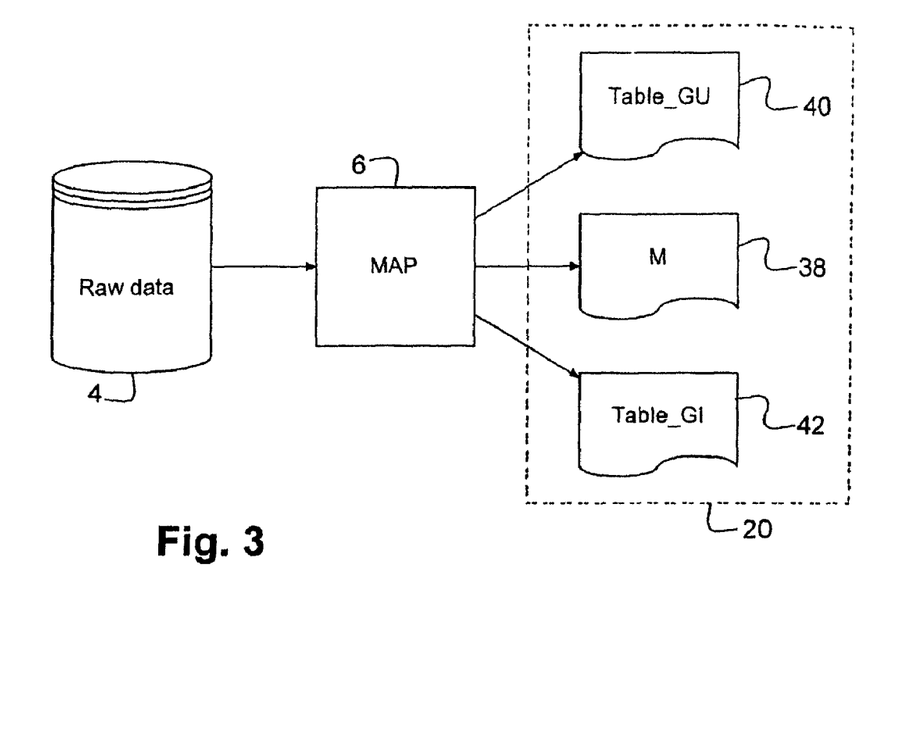

As shown in FIG. 2, the raw data available are taken from the source 4. In a first step M1, the controller 10 calls up the classifier 12 and carries out a cross-classification on these raw data, using a criterion based on a metric that reflects the presence or absence of a matrix element for each of the rows and columns.

Cross-classification is a known method of sorting which generally consists of simultaneously crossing the columns and rows of a data table according to a selected criterion.

One example of a method of cross-classification may be found in "Information-theoretic co-clustering", by Inderjit S. Dhillon, Subramanyam Mallela, and Dharmendra S. Modha, on pages 89-98 of "Proceedings of the Ninth ACM SIGKGG International Conference on Knowledge Discovery and Data Mining (KDD), 2003".

The cross-classification in step M1 is double, so as to obtain as output a classified raw matrix 30 which is made up of matrix blocks which are smaller in size, on the one hand, and transition matrices which enable the original matrix to be retrieved. The matrix blocks may be totally filled or may also have non-filled matrix elements.

The matrix blocks in the matrix 30 constitute a simplified view of the starting matrix. Thus, where there may have been blocks of 1000*1000, for example, there are now blocks of 10*10. The double cross-classification is accompanied by the creation of a transition matrix, enabling the original matrix to be reconstituted from the reduced blocks obtained.

As has already been explained hereinbefore, the basic matrix is extremely hollow. This means that a large proportion of the matrix elements of this matrix are empty. This first metric used to classify the data, based on the presence or absence of the matrix element, is intended to make it possible to distinguish between the groups that have a large amount of information from the others.

In a step M2, the controller 10 processes all the blocks of the matrix 30 by calculating the density of the latter. This density is representative of the matrix element presence/absence profile in each block.

A test M3 relating to the density of each block determines the type of filling which is then applied to the empty elements of this block.

In fact, in the embodiment described here, the background module builds a model 8 which contains no empty matrix element, and thus makes it possible to have a recommendation of each object for each actor. It would nevertheless be possible to fill the model 8 only partially.

When a given block has a sufficient density, the controller 10 calls up the classifier 12 again in a step M4 and again carries out a double cross-classification on this block, this time with a criterion based on a metric reflecting the value of the matrix elements of this block. This classification results in an intermediate classified dense block 32) and the corresponding transition matrices.

To ensure that the block 32 is totally filled, the controller 10 calls up the smoother 14 in a step M5. The smoother 14 applies the algorithm described in Annexe 1 until a stability criterion has been achieved.

In the algorithm in Annexe 1, R denotes the matrix of the scores and R(u,a) is the score given by the actor u to the object a. The score P(u) is given to all the objects scored by the actor u and the score U(a) is given to all the actors who have scored the object a.

The iterative calculation is initialised with two identity matrices, called C0u (correlations between actors) and C0p (correlations between objects). In step n, the correlation matrix between actors is scored Cnu, and the correlation matrix between objects is scored Cnp. The calculation of the matrices Cnu and Cnp is carried out by crossing on the basis of the matrices calculated in the previous step.

Thus, as shown by formula 11 in Annexe 1, the matrix Cnu calculated in step n is established on the basis of the matrix C(n−1)p in step (n−1). Similarly, as shown in formula 21, the matrix Cnp, also calculated in step n, is established on the basis of the matrix (C(n−1)u in step (n−1) 21. The formulae 12 to 14 and 22 to 24 specify the elements of formulae 11 and 21.

Specifically, the algorithm in step M5 consists in filling the empty matrix elements on the basis of selected adjacent matrix elements (the objects scored by the actors for the matrix Cnu, and the actors having scored the objects for the matrix Cnp).

The filling is carried out by correlation according to the rows of the matrix during a first stage (Cnu), then according to the columns during a second stage (Cnp). The empty matrix elements are thus filled by iteration which crosses the values of adjacent matrix elements, thus constituting filling by correlation along both the rows and the columns simultaneously.

Although this algorithm may be seen in the form of an alternation between iteration across the rows/iteration down the columns, it would be possible to use an algorithm which, in a single operation, would carry out a similar type of filling based on a correlation over both the rows and columns simultaneously.

This algorithm results in a filled dense block 34.

In the event that the block 30 is not dense, the controller 10 calls up the smoother 14 in a step M6, the result of which is a filled hollow block 36.

The filling in step M6 is a so-called "averaged" filling, i.e. it consists in giving the empty matrix elements the value of the average of the non-empty elements in this block, if there are any, and in filling all the empty matrix elements on the basis of an average of the matrix elements of the surrounding blocks if the block contains only empty matrix elements.

In a step M7, a test is carried out to see whether all the blocks in the matrix 30 have been treated. The result obtained is a matrix of filled blocks 38 which will serve as a basis for the matrix model 8.

In a step M8, the controller establishes the set of on-line matrices 20. FIG. 3 specifies the set of matrices 20. As can be seen in this Figure, the set of matrices 20 comprises the main matrix 38, a matrix or table 40 referred to as the Table_GU and a matrix or table 42 referred to as the Table_GI.

The matrix 38 contains rows denoting groups of actors and columns denoting groups of objects. The matrix 40 contains rows denoting actor identifiers and columns designating groups of actors. The matrix 42 contains groups of objects in rows and object identifiers in columns.

The matrices 40 and 42 are obtained from transition matrices which are produced during the various double cross-classifications, and are constructed at the same time as the matrix M.

Because of the metric used for the double cross-classification used in the embodiment described here, the transition matrices 40 and 42 are extremely hollow, and contain only one non-zero value per row for the matrix 40 and only one non-zero value per column for the matrix 42.

However, it would be possible to carry out a cross-classification involving a weighted metric, which would enable the users to be assigned to a number of groups in weighted manner, and the same for the objects.

Figure 4:
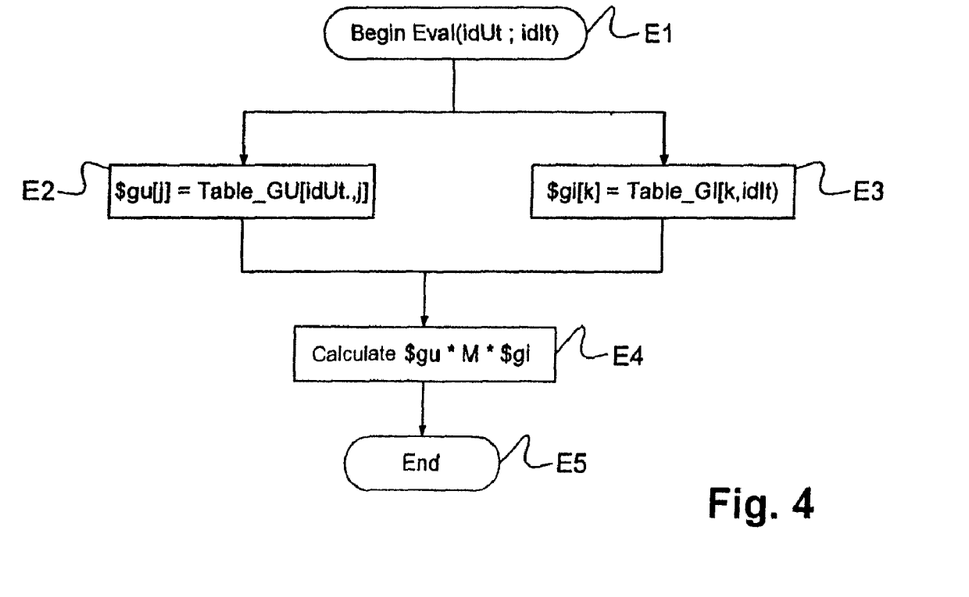
FIGS. 4 to 7 show functions carried out by an on-line part in FIG. 1.

FIG. 4 shows an example of an evaluating function based on the set 20, which makes it possible to evaluate a value of a vote on an object which has an object identifier idIt by a user who has an actor identifier idUt, the user obviously not having evaluated this object before.

The evaluating function of the selection manager 16 is based on having previously obtained, in a step E1, a pair of identifiers (idUt, idIt) of an actor on the one hand and an object on the other hand.

In simultaneous steps E2 and E3, the manager recovers, from the tables Table_GU and Table_GI (the matrices 40 and 42), the row corresponding to idUt and the column corresponding to idIt, and stores them in two vectors $gu and $gi, respectively.

In a step E4, the evaluation is defined as the product of $gu*M*$gi. This formula is based on the hypothesis that the sum of the terms in the rows in the table Table_GU and the sum of the terms in the columns in the table Table_GI are both equal to 1, as the result of a standardisation carried out during the generation of these two tables.

In the embodiment described here, as the matrices 40 and 42 are hollow, this amounts to a multiplication. However, the sole interest of this matrix formalisation is in a classification with weighting as mentioned above. The value evaluated is then sent back in a step E5.

The evaluating function described above makes it possible to implement an important number of functions for the user 18. In fact, the user can directly designate an object for which he wishes to obtain an evaluation, but he may also designate a class of objects, which the selection manager 16 can selectively associate with object identifiers and send back their evaluations.

The user 18 may also supply a selected evaluation and obtain from the selection manager 16 a list of objects that correspond to this evaluation. It is also possible to combine a number of these requests to provide greater flexibility of use.

To ensure that the evaluation is achievable and reasonably reliable, the user designated by the identifier idUt must have votes in the data source 4 or in the stack 22. Otherwise, it is not possible to assign this user to a group in the table Table_GU and an evaluation can only be made for example based on the average of all the groups in the table Table_GU.

Figure 5:
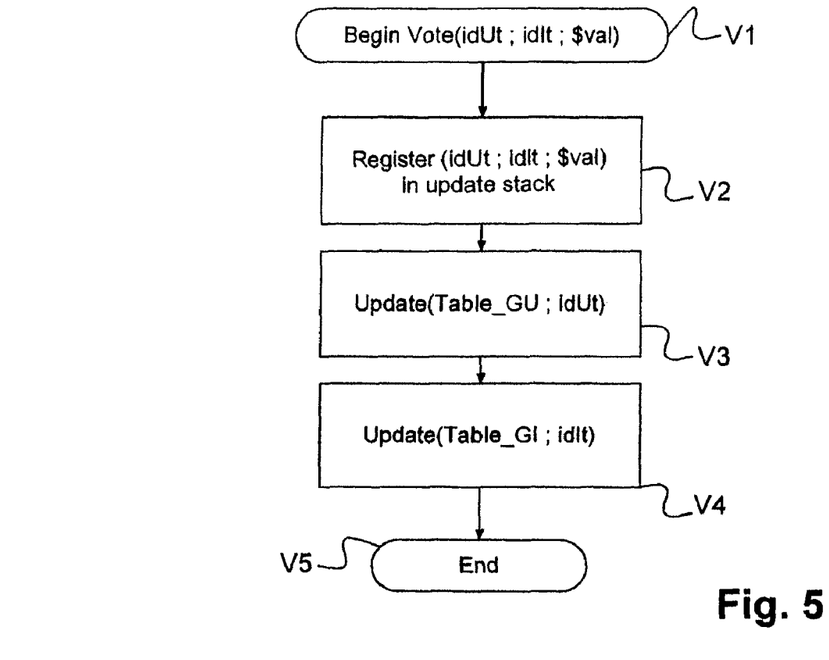

To update the data of a given user and take into account recent votes before the updating of the set 20 on the basis of the model 8, the selection manager 16 uses a Vote function shown in FIG. 5.

Starting with a step V1 in which a user with an actor identifier idUt provides the selection manager 16 with a vote of value $val relating to an object with the object identifier idIt, the triplet (idUt, idIt, $val) is first of all recorded in the stack 22 in a step V2, for subsequent integration in the source 4 and in the model 8.

Then, in two steps V3 and V4, which may be carried out in parallel or in series, the selection manager updates the matrices 40 and 42 on the basis of the actor identifier idUt and object identifier idIt, respectively.

The steps V3 and V4 may also be carried out selectively and at separate times, in order to take account of the profile of a user or the product to which the vote relates.

In fact, the first votes of a user (or the first votes received by a product) have a primordial influence on its classification in a given group of actors (or a given group of objects, respectively).

Each vote thus has a tendency to make it change groups. After a certain number of votes, its membership of a group stabilises and there is little chance that a single vote will cause it to change.

It therefore seems more important to update the table Table_GU (or the table Table_GI, respectively) when a vote is registered for a user having few votes, than for a user who already has many votes.

When an actor (or a product, respectively) has a substantial number of votes, e.g. 100, the background module can therefore apply step V3 (or step V4, respectively) selectively and/or offset in time, for example every ten votes, so as to lighten the computing load, and thus improve the performance of the application.

Updating is carried out using an Update function described in connection with FIG. 6.

In a step U1, the function is called up with, as argument, the table which is to be updated and the identifier number id of the row or column to be updated. This updating could also be carried out with a single function called up with the two identifiers.

In a step U2, a test is carried out to see whether the table to be updated is that of the groups of actors (matrix 40 or Table_GU) or that of the groups of objects (matrix 42 or Table_GI).

If it is the Table_GU, in a step U3, the values of the matrix elements associated with id in the source 4 and those contained in the stack 22 are combined in a vector describing all the votes (and non-votes) of the user linked to id.

The vector thus formed is then "projected" in a step U4 onto M*Table_GI, in order to determine the group of actors to which this user should be attached. One embodiment of step U4 will be described hereinafter with reference to FIG. 7.

If it is the Table_GI, in a step U5, the values of the matrix elements associated with id in the source 4 and those contained in the stack 22 are combined in a vector describing all the votes (and non-votes) relating to the object linked to id.

The vector thus formed is then "projected" in a step U6 onto Table_GU*M, in order to determine the group of objects to which this object should be attached. One embodiment of step U6 will be described hereinafter with reference to FIG. 7.

In a step P1, the Project function shown in FIG. 7 receives as argument the table which is to be updated, the identifier of the row or column in question, and the votes vector described in connection with FIG. 6.

In a step P2, the type of table is determined and designates the operation which will be carried out. If it is the table Table_GU (matrix 40) that is involved, then the projection is carried out in a step P3, by forming the product of M*Table_GI*$vect. The column vector $vect2 which results from this product is the "projection" described hereinbefore.

The table Table_GU is then updated in a step P4 by updating the id row of this table, in which the only non-zero term is the one whose column corresponds to the index that represents the maximum value of $vect2. Thus, the table Table_GU keeps the same form as before.

As described hereinbefore, it would also be possible to keep all the values of $vect2 in the table Table_GU, in order to obtain a weighted assignment of the user to the groups of actors.

Figure 6:
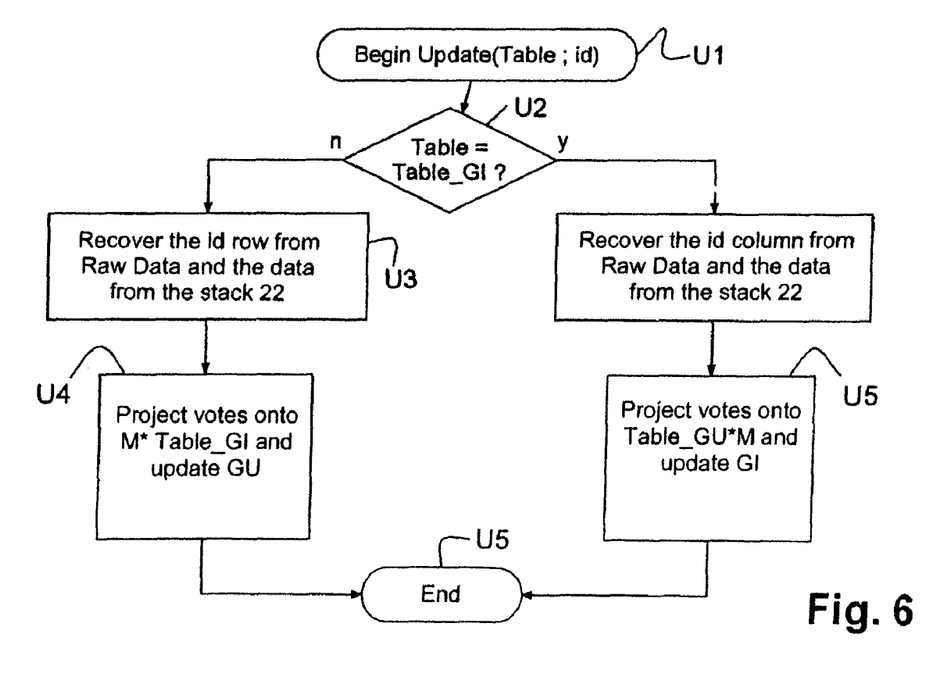
Figure 7:
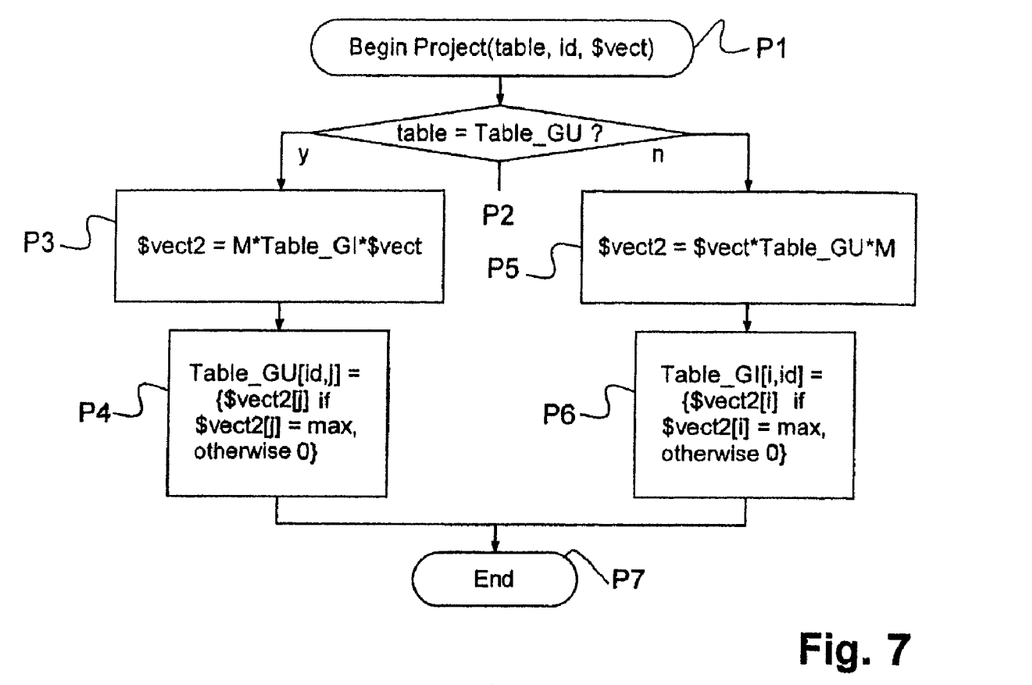

If it is the table Table_GI that is involved, then steps P5 and P6 are carried out, in operations similar to those in steps P3 and P4, which will become obvious in the light of FIG. 6 and the foregoing description.

However, it should be noted that, in the case of step P3, the vector $vect is a row vector, whereas in the case of step P5, the vector $vect is a column vector.

Once the projection has been carried out and the table has been updated, the end of this function is carried out in a step P7 and the sequence of the preceding operations follow their course.

The invention also relates to a computer program code for operating the apparatus described above, and a data carrier for such a program.

In the embodiment described here, the model is obtained by means of two double cross-classifications with criteria based on a presence metric of the matrix element on the one hand and a value metric of the matrix element on the other hand.

However, it would also be feasible to carry out a single double cross-classification with a criterion combining these two metrics. Moreover, this specification has described methods of computation using conventional matrix computing, but it would also be possible to use slightly modified matrix operators, notably to take account of the partial void in the elements of such a calculation.

Annexe 1

Section 1

$$C_u^n(u, v) = \frac{1}{\eta_{u,v}} \sum_{a \in P(u), b \in P(v)} C_p^{n-1}(a, b) \frac{R(u, a) - \mu_u}{\sigma_u} \frac{R(u, b) - \mu_v}{\sigma_v} \quad (11)$$

$$\eta_{u,u} = \sum_{a \in P(u), b \in P(v)} C_p^{n-1}(a, b) \quad (12)$$

$$\mu_u = \frac{1}{\eta_{u,v}} \sum_{a \in P(u), b \in P(v)} C_p^{n-1}(a, b) R(u, a) \quad (13)$$

$$\sigma_u^2 = \frac{1}{\eta_{u,v}} \sum_{a \in P(u), b \in P(v)} C_p^{n-1}(a, b)(R(u, a) - \mu_u)^2. \quad (14)$$

Section 2

$$C_p^n(a, b) = \frac{1}{\eta_{a,b}} \sum_{u \in U(a), v \in U(b)} C_u^{n-1}(u, v) \frac{R(u, a) - \mu_a}{\sigma_a} \frac{R(v, b) - \mu_b}{\sigma_b} \quad (21)$$

$$\eta_{a,b} = \sum_{u \in U(a), v \in U(b)} C_u^{n-1}(u, v) \quad (22)$$

$$\mu_a = \frac{1}{\eta_{a,b}} \sum_{u \in U(a), v \in U(b)} C_u^{n-1}(u, v) R(u, a) \quad (23)$$

$$\sigma_a^2 = \frac{1}{\eta_{a,b}} \sum_{u \in U(a), v \in U(b)} C_u^{n-1}(u, v)(R(u, a) - \mu_a)^2 \quad (24)$$

The invention claimed is:

1. Data processing apparatus for propagative correlation comprising:
    a memory for storing a raw matrix cross-classifying object identifiers (idIt) and actor identifiers (idUt) and storing evaluation values for objects identified by the object identifiers, wherein the evaluation values are provided by users identified by the actor identifiers;
    a background module configured to convert the raw matrix into reclassified matrix blocks as a function of a criterion linked to a matrix element in the raw matrix; and
    a selection manager configured to look up, in response to receiving an input actor identifier, the received input actor identifier in a first table which contains links, each of which the links associating a particular one of the actor identifiers (idUt) with one or more of the reclassified matrix blocks the selection manager being further configured to present information based on contents of the one or more reclassified matrix blocks associated with the input actor identifier (idUt),
    wherein, the background module includes a cross-classifier for converting the raw matrix into the reclassified matrix blocks based on a criterion that combines a presence metric reflecting whether or not the matrix element is present or absent in the raw matrix, and a value metric reflecting an evaluation value of the matrix element, and
    wherein, the selection manager provides recommendations concerning objects which are a priori unrelated to objects for which users have made evaluations, based on the reclassified matrix blocks.

2. Apparatus according to claim 1, wherein the background module comprises a controller for invoking the cross-classifier with a criterion associated with the presence of the matrix element, to collate, at the same time, the actor identifiers (idUt) based on a profile reflecting presence or absence of the matrix elements with respect to the object identifiers (idIt), and the object identifiers (idlt) based on a profile reflecting presence or absence of the matrix elements with respect to the actor identifiers (idUt), to convert the raw matrix into intermediate matrix blocks.

3. Apparatus according to claim 2, wherein the controller iteratively and selectively invokes the cross-classifier with a criterion associated with the evaluation value of the matrix element over at least some of the intermediate matrix blocks of having a selected density to for converting the at least some of the intermediate matrix blocks into the reclassified matrix blocks,
wherein the density of an intermediate matrix block is based on presence or absence of matrix elements of the block.

4. Apparatus according to claim 1, wherein the background module further comprises a smoother configured to fill empty matrix elements of a given matrix block, as a function of a criterion associated with density of the block, to obtain a filled block, wherein the density of the block is based on presence or absence of matrix elements of the block.

5. Apparatus according to claim 4, wherein the smoother is configured to selectively fill, by propinquity, the empty matrix elements of a matrix block that has a selected density.

6. Apparatus according to claim 5, wherein the smoother is configured to fill the empty matrix elements of a matrix block based on an iteration that selectively cross-classifies the evaluation values of the matrix elements adjacent to the empty matrix elements.

7. Apparatus according to claim 4, wherein the smoother is of configured to selectively fill, by average, the empty matrix elements of a matrix block that has a selected density.

8. Apparatus according to claim 1, wherein the selection manager presents the information as a function of a second table, which contains links, each of the links associating a reclassified matrix block with one or more object identifiers (idlt).

9. Apparatus according to claim 8, wherein the selection manager is configured to update the first and second tables based on a new matrix element reflecting an evaluation value of a particular object by a particular actor.

10. Apparatus according to claim 9, wherein the selection manager is configured to store said matrix element in the memory.

* * * * *

UNITED STATES PATENT AND TRADEMARK OFFICE
CERTIFICATE OF CORRECTION

PATENT NO. : 7,853,588 B2
APPLICATION NO. : 11/858069
DATED : December 14, 2010
INVENTOR(S) : Franck LeOuay It is certified that error appears in the above-identified patent and that said Letters Patent is hereby corrected as shown below:

On the Title Page (57) Abstract, line 12

After "matrix"
Insert -- into reclassified matrix blocks according to a criterion that combines a presence metric --

In the Claims

Column 8, Claim 1, line 36

Delete "(idlt)"
Insert -- (idIt) --

Column 8, Claim 1, line 46

Delete "which"

Column 9, Claim 2, line 1

Delete "(idlt)"
Insert -- (idIt) --

Column 9, Claim 3, line 9

Delete "of having a selected density to for converting the at least some"

Insert -- having a selected density for converting the at least some --

Column 9, Claim 5, line 22

Delete "propinquity,"
Insert -- propinquity (M5), --

Column 10, Claim 6, line 4

Before "matrix"
Delete "the"

Signed and Sealed this
Tenth Day of January, 2012

David J. Kappos
*Director of the United States Patent and Trademark Office*

CERTIFICATE OF CORRECTION (continued)
U.S. Pat. No. 7,853,588 B2

| | |
|---|---|
| Column 10, Claim 7, line 7 | Delete "of" |
| | Delete "average," |
| | Insert -- average (M6), -- |
| Column 10, Claim 8, line 13 | Delete "(idlt)" |
| | Insert -- (idIt) -- |